United States Patent Office 3,772,304
Patented Nov. 13, 1973

3,772,304
4-HYDROXY-ISOQUINOLINES AND PROCESSES FOR THEIR PREPARATION
Guenter Grethe, North Caldwell, Hsi Lin Lee, West Paterson, and Milan Radoje Uskokovic, Upper Montclair, N.J., assignors to Hoffmann-La Roche Inc., Nutley, N.J.
No Drawing. Application Oct. 30, 1969, Ser. No. 872,767, now Patent No. 3,629,265, dated Dec. 12, 1971, which is a continuation-in-part of abandoned application Ser. No. 571,406, Aug. 10, 1966. Divided and this application Mar. 19, 1971, Ser. No. 126,321
Int. Cl. C07d 35/10
U.S. Cl. 260—287 R                                                       6 Claims

ABSTRACT OF THE DISCLOSURE 4-hydroxy-isoquinolines are disclosed. The compounds are useful as blood pressure lowering agents.

RELATED CASES

This application is a divisional application of co-pending application Ser. No. 872,767, filed Oct. 30, 1969, now U.S. Pat. 3,629,265, issued Dec. 21, 1971, which in turn is a continuation-in-part of application Ser. No. 571,406 filed Aug. 10, 1966, now abandoned.

DESCRIPTION OF THE INVENTION

The present invention relates to novel organic compounds, processes for preparing the same and intermediates useful in the preparation of said novel compounds.

Particularly, said novel organic compounds mentioned above are 4-isoquinolones. These novel compounds are useful in view of their blood pressure lowering effects and in view of their capability of being converted into 1,2,3,4-tetrahydroisoquinolines useful as antihypertensive agents.

More particularly, the 4-isoquinolones of the present invention are of the formula

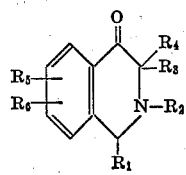

(I)

wherein $R_1$ is selected from the group consisting of hydrogen, lower alkyl, phenyl and halophenyl; $R_2$ is selected from the group consisting of hydrogen, lower alkyl, benzyl and substituted benzyl selected from the group consisting of benzyl substituted on the phenyl moiety with lower alkyl and halo, and $\alpha$-lower alkyl-substituted benzyl; $R_3$ is selected from the group consisting of hydrogen, carboxy and lower alkoxycarbonyl; $R_4$ is selected from the group consisting of hydrogen and lower alkyl; $R_5$ and $R_6$ are each selected from the group consisting of hydrogen, halogen, lower alkoxy, lower alkyl and hydroxy, at least one of $R_5$ and $R_6$ being other than hydrogen.

The term "halogen" as used throughout the instant disclosure and claims is intended to connote all four forms thereof, unless otherwise specified. Especially preferred for the purposes of the present invention are chlorine and bromine. The expression "lower alkyl" is intended to connote both straight and branched chain hydrocarbon groups containing from 1–7 carbon atoms, preferably 1–4 carbon atoms, such as methyl, ethyl, propyl, butyl and the like. The expression "substituted benzyl" is intended to designate a benzyl group substituted in the $\alpha$-position, for example, with a lower alkyl group, e.g., methyl or a benzyl group substituted in the phenyl nucleus thereof with a substituent such as lower alkyl, e.g., methyl, halo (chlorine) and the like. The term "lower alkoxy" represents a straight or branched chain hydrocarbonoxy group having 1–7 carbon atoms, preferentially methoxy and the like.

Preferred among the compounds of Formula I are those where at least one of $R_5$ or $R_6$ is hydroxy or halogen, preferably chlorine. Most preferred among the compounds of Formula I are those wherein $R_5$ is hydrogen and $R_6$ is hydroxy or halogen and is joined to the fused benzo moiety of the isoquinolone nucleus in the 7-position.

The compounds of Formula I above may be prepared by a variety of reaction routes. One preferred process aspect of the present invention is illustrated in the following diagrammatical flowsheet. The characters $R_1$–$R_6$ found in said flowsheet have the same meaning as ascribed thereto hereinabove; with $R_4$ preferably being hydrogen.

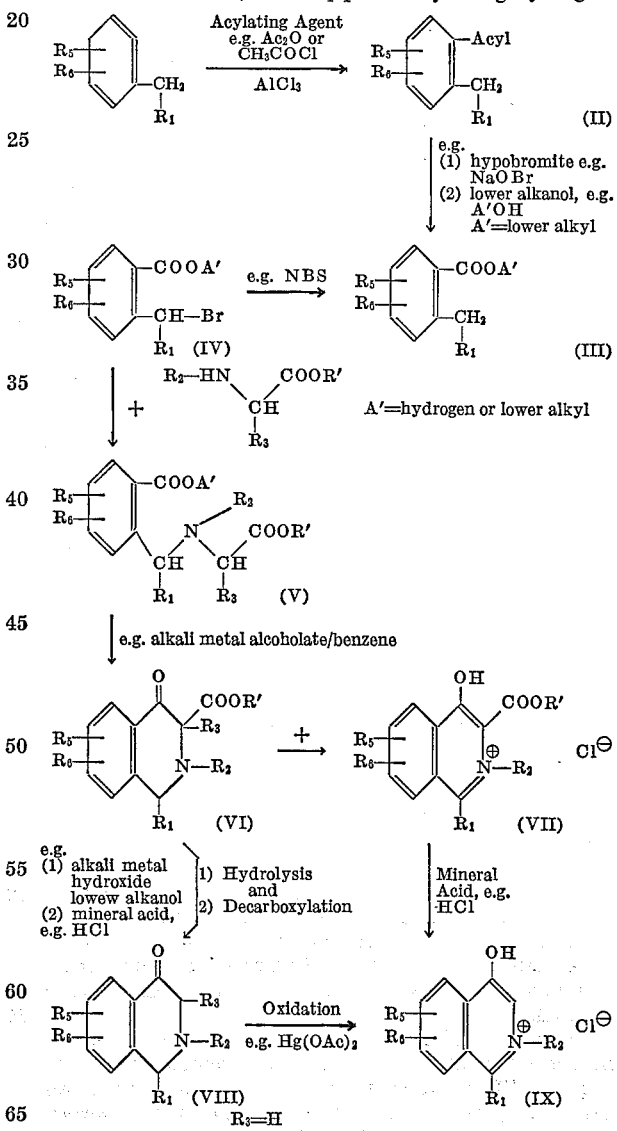

In the first stage of the process illustrated hereinabove, a toluene derivative is acylated utilizing any conveniently available acylating agent capable of effecting this end by procedures well established in the art, for example, utilizing the Friedel-Crafts technique. Thus, toluene or a substituted derivative thereof is treated with a lower alkanoyl anhydride, e.g., acetic anhydride or a lower alkanoyl halide, e.g., acetyl halide (acetyl chloride) whereby to obtain a compound of the Formula II above.

The resulting compound of the Formula II is then converted into the corresponding compound of the Formula III utilizing any system capable of providing a COOA' group in the 2-position of the toluene ring as shown in the above diagrammatical flowsheet. For example, a system comprising an alkali metal hypobromite, e.g., NaOBr and a lower alkanol, e.g., methanol, can be utilized to prepare a compound wherein A' is lower alkyl. In the first stage, i.e., the treatment with an alkali metal hypobromite, a compound of the Formula III above wherein A' is hydrogen, is prepared.

The conversion of a compound of the Formula III into the corresponding compounds of the Formula IV above constitutes a particularly efficacious process step in the procedure found in the above diagrammatical flowsheet. In this process step, the compound of the Formula III above is treated with N-bromosuccinimide in the presence of a free radical catalyst, for example, dibenzoyl peroxide, azo-bis-isobutyronitrile and the like. The so-obtained compound of the Formula IV above is then reacted with a glycine derivative of the formula

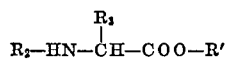

wherein $R_2$, $R_3$ and R' are as above
whereby to prepare the corresponding compound of the Formula V above.

The conversion of a compound of the Formula IV to the corresponding compounds of the Formula V is suitably effected in the presence of any conveniently available acid binding agent. Among the acid acceptors suitable for this purpose may be included tertiary amines such as tri-lower alkyl amines, e.g. triethyl amine and the like. In one process aspect, an acid acceptor can be provided in excessive amounts whereby it serves also as the solvent medium. By this simple expedient, there is provided to the reaction zone, a single substance which performs a dual function, namely, as the solvent medium an acid acceptor. In an alternate process aspect of the present invention, the reaction can be effected in the presence of an inert organic solvent such as an aromatic hydrocarbon, e.g. benzene, an ether such as diethyl ether and the like. The acid acceptor can be added to the solution of the reactant in the solvent medium.

The resulting compound of the Formula V above is then cyclized to obtain a mixture containing a compound of the Formula VI above in a major proportion and a compound of the Formula VII above in a minor proportion. The cyclization is effected with any base capable of effecting this end, such as alkali metal alcoholates, e.g. sodium ethoxide and the like, alkali metal hydrides, e.g. sodium hydride, sodamide and the like and similar type bases. It is preferred to effect the conversion of the compound of the Formula V into the said mixture in the presence of a suitable inert organic solvent such as an aromatic hydrocarbon, e.g. benzene, xylene and the like or a similar type solvent. While temperature and pressure are not critical aspects of this process step, the cyclization of a compound of the Formula V above is advantageously conducted at elevated temperatures, most preferably at about the reflux temperature of the reaction medium.

Compounds of the Formula VI above, if desired, can be converted into the corresponding compounds of the Formula VII above by treatment of the former with an oxidizing agent such as mercuric acetate in the presence of acetic acid. Compounds of the Formula VI above, i.e. compounds of the Formula I above wherein $R_3$ is a lower alkyloxy carbonyl group, can be converted into the corresponding compound of the Formula I above wherein $R_3$ is hydrogen, i.e. a compound of the Formula VIII, by a two-step technique which involves in the first step a hydrolysis and then a decarboxylation according to techniques well documented in the literature. Where $R_3$ is a carboxy group, only decarboxylation is necessary. For example, the hydrolysis and decarboxylation of a compound of the Formula VI wherein $R_3$ is lower alkoxy carbonyl to the corresponding compound of the Formula I above can be effected by first adding sodium hydroxide to the reaction medium containing a compound of the Formula VI and then adding hydrochloric acid to the so-formed mixture. The two steps are preferably effected in the presence of a lower alkanol such as ehanol.

In the conversion of a compound of the Formula V above to a mixture of a compound of the Formulas VI and VII above, it was observed that the resulting compounds which comprise the mixture differ in basicity. This difference in basicity made the separation of these two components quite facile by techniques well documented in the literature.

Compounds of the Formulas VII and IX above wherein $R_2$ is a benzyl group can be debenzylated by catalytic hydrogenation to isoquinolines. Hydrogenolytic debenzylation of the isoquinoline salts at room temperature in acetic acid solution with palladium-on-carbon as the catalyst give the known 4-hydroxyisoquinolines of the Formula X.

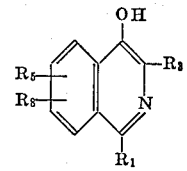

(X)

Compounds of the Formula I above, as is noted, if desired, can be converted into a wide variety of reaction products which ultimately lead to the known 1,2,3,4-tetrahydroisoquinolines mentioned above of established usefulness. For example, 1,2,3,4-tetrahydroisoquinolines of the formula

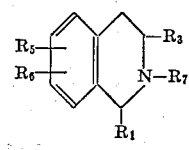

(XI)

wherein $R_1$, $R_3$, $R_5$, and $R_6$ are as above and $R_7$ is selected from the group consisting of hydrogen and lower alkyl can be obtained by reducing the compounds of the Formula I above with any suitable system capable of effecting the removal of the ketone group in position 4 thereof. For example, the 1,2,3,4-tetrahydroisoquinolines of the Formula XI above can be prepared from the corresponding compounds of the Formula I by hydrogenation with 10% Pd/C in glacial acetic acid. When proceeding along this path, there is also obtained 4-hydroxy-1,2,3,4-tetrahydroisoquinolines of the formula

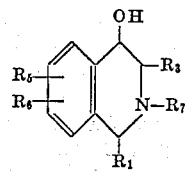

(XII)

When performing the reduction with Pd/C, elevated temperatures and elevated pressures are preferred, e.g. at about 90° C., and about 80 atms. Among the known compounds encompassed by the Formula XI, there may be included salsolin, salsolidine, carnegin and corypallia. Salsolin has long been employed as an anti-hypertensive agent.

In another reaction route, the compounds of the Formula I above wherein $R_3$ is hydrogen can be converted with 1,2-ethane dithiol to the thio ketals of the formula

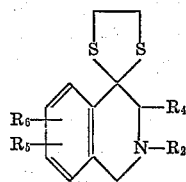

(XIII)

wherein $R_1$, $R_2$, $R_4$, $R_5$, and $R_6$ are as above.

The resulting product of the Formula XIII can be desulfurized utilizing ethanol and Raney nickel to provide the desired 1,2,3,4-tetrahydroisoquinolines of the Formula XI above.

Compounds of the Formula I above can also be converted into compounds of the formula

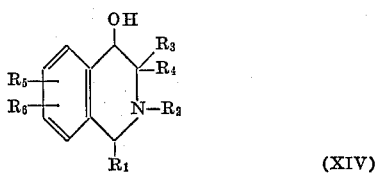

(XIV)

wherein $R_1$–$R_6$ are as described above.

These 4-hydroxy tetrahydro isoquinolines are novel products and as such form a part of the present invention. If desired the so-obtained hydroxy derivatives can be esterified utilizing, for example, lower alkanoic acid anhydrides, e.g. propionic anhydride, in the presence of pyridine to thereby prepare a compound of the formula

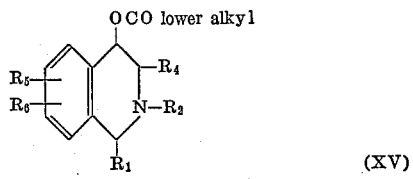

(XV)

However, it is of course understood that any suitable esterification system can be utilized for the purposes of the present invention.

Compounds of the Formula I wherein $R_3$ is selected from the group consisting of lower alkoxycarbonyl, i.e. compounds of the formula

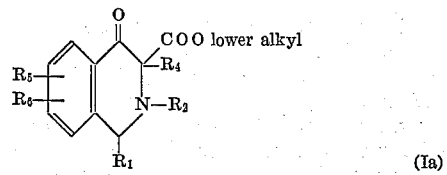

(Ia)

can be converted into the corresponding 4-hydroxy compounds which contain a lower alkoxy carbonyl group, a —COOH group or a hydroxy-lower alkyl group. The reaction can be illustrated diagrammatically as follows:

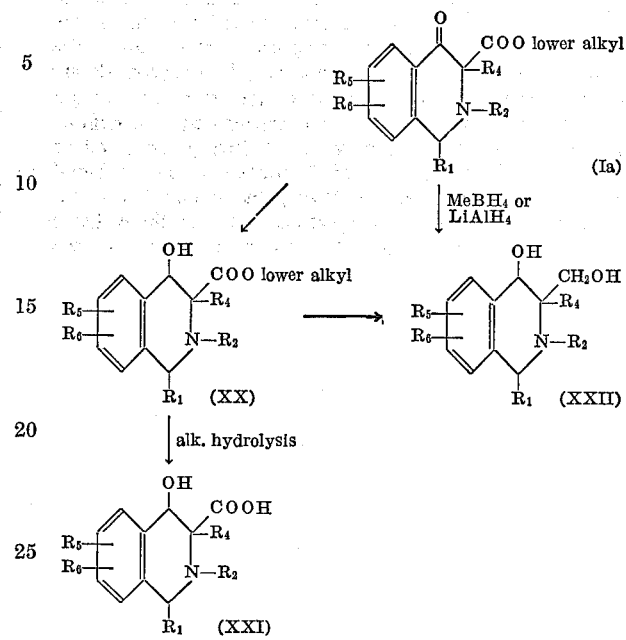

The conversion of a compound of the Formula Ia to the corresponding compound of the Formula XX proceeds with a borohydride, preferably, an alkali metal borohydride, e.g. sodium borohydride in the presence of a suitable solvent, such as a mixture of ethyl acetate and ethanol, at below room temperature, e.g. from about 0° to about 15° C. The subsequent conversion of a compound of the Formula XX to a compound of the Formula XXI is effected by alkaline hydrolysis according to techniques well established in the art, e.g. with sodium hydroxide.

The preparation of a compound of the Formula XXII above from a compound of the Formula Ia above can be effected with $LiAlH_4$. Alternatively, a borohydride such as an alkali metal borohydride, e.g. sodium borohydride can be utilized in the presence of a solvent medium more polar than that capable of being utilized to effect the preparation of a compound of the Formula XX above, such as a mixture of ethanol and methanol, at above room temperature i.e. in a range of from about room temperature to about 50° C.

Compounds of any of the formulas above which bear a benzyl group in the $R_2$-position can be debenzylated according to known procedures, e.g. hydrogenation with any suitable novel metal catalyst system, e.g. palladium-on-charcoal.

Compounds in which $R_5$ and $R_6$ connote methoxy can be converted into the corresponding compounds wherein $R_5$ and $R_6$ are hydroxy utilizing a system which will effect ether cleavage of a lower alkoxy group. An example of a system capable of effecting this end is hydrobromic acid and glacial acetic acid. Advantageously, the ether cleavage is effected at about the reflux temperature of the reaction medium in which the lower alkoxy compounds find themselves. While many solvents can be employed as the solvent medium, in an advantageous process aspect, glacial acetic acid is employed as the medium in which the ether cleavage is effected.

In addition to their capability of being converted into the pharmaceutically useful 1,2,3,4 - tetrahydroisoquinolines, the compounds of Formula I above and their pharmaceutically acceptable salts are themselves effective as blood pressure lowering agents. The novel 4-hydroxy compounds of Formula XIV above likewise exhibit activity as blood pressure lowering agents. Their useful hypotensive activity is shown in warm blooded animals utilizing a standard primary blood pressure screening technique. This test utilizes one anesthetized dog. Carotid arterial blood pressures are recorded and a series of "control" response of blood pressure and respiration are obtained. After the control responses are obtained, the drug to be tested is intravenously administered slowly over a five minute period at a dose not exceeding 10 mg./kg. The injection of the drug is terminated if a definite change in blood pressure occurs. Utilizing the standard procedure, the compounds of Formula I produce a blood pressure lowering effect. Following the standard test procedure, representative compounds such as these listed below exhibit blood pressure lowering activity at the indicated dosage levels:

2-benzyl-7-hydroxy-1,2-dihydro-4(3H)-isoquinolone hydrobromide, 4 mg./kg.;
2-benzyl-1,2,3,4-tetrahydro-4,7-isoquinolinediol hydrochloride, 4 mg./kg.;
1,2,3,4-tetrahydro-7-methoxy-2-methyl-1-phenyl-4-isoquinolinol hydrochloride, 4 mg./kg.;
2-benzyl-1,2,3,4-tetrahydro-7-methoxy-4-isoquinolinol hydrochloride, 4 mg./kg.

Among the most interesting members of the class encompassed by Formula I above are those compounds wherein $R_1$, $R_4$ and $R_6$ are all hydrogen, $R_2$ is benzyl, $R_3$ is selected from the group consisting of hydrogen and lower alkoxy carbonyl and $R_5$ is joined to the isoquinoline moiety at the 7-position and is selected from the group consisting of halogen, preferentially chlorine, and hydroxy.

Compounds of the Formulas XX, XXI and XXII are novel compounds and are antiinflammatory and nor-epinephrine potentiating agents. Preferred for this purpose are compounds of the Formulas XX, XXI and XXII wherein $R_4$ and at least one of $R_5$ and $R_6$ is hydrogen and $R_2$ is benzyl.

The compounds of the Formulas I and XIV above form non-toxic salts with pharmaceutically acceptable acids. These compounds can form such pharmaceutically acceptable salts with inorganic and organic acids such as hydrochloric acid, hydrobromic acid, phosphorus acid, citric acid, tartaric acid, toluene sulfonic acid, ascorbic acid, maleic acid, succinic acid, formic acid, acetic acid and the like.

The compounds of the Formulas I and XIV above can be administered in pharmaceutical dosage forms internally, for example, parenterally or enterally, with dosage adjusted to fit the exigencies of the therapeutic situation. The active ingredient can be in corporated in pharmaceutically acceptable inert carriers to thereby provide tablets, dragées, suppositories, elixirs, emulsions, powders and the like according to conventional pharmaceutical dosage forms. The carrier for the pharmaceutical dosage forms may be water, lactose, magnesium stearate, talc, vegetable oils or any equivalent material.

The following examples are illustrative but not limitative of the present invention. All temperatures are stated in degree centigrade.

Example 1

A mixture of 1 g. of 2-benzyl-1,2-dihydro-7-methoxy-4(3H)-isoquinolone and 150 mg. of 5% palladium on charcoal in 50 ml. of glacial acetic acid was hydrogenated at normal pressure and room temperature until the hydrogen uptake ceased. Removal of the catalyst by filtration was followed by evaporation of the filtrate to dryness under vacuum. The oily residue was dissolved in ether and, upon addition of isopropanolic hydrochloric acid, crystalline 7-methoxy - 1,2,3,4 - tetrahydro - 4 - isoquinolinol hydrochloride was obtained. Recrystallization from ethanol gave the isoquinolinol hydrochloride of 168–170°.

Example 2

A mixture of 8 g. of 2-benzyl - 1,2 - dihydro-7-methoxy-1-methyl - 4(3H) - isoquinolone and 0.9 g. 10% palladium on charcoal in 320 ml. of glacial acetic acid was hydrogenated at normal pressure and room temperature for 1 hr. Hydrogenation then was continued for 1.5 hrs. at 60–70° and at room temperature overnight. The mixture was filtered and the filtrate evaporated to dryness under vacuum. The residue was dissolved in isopropanol, an excess of isopropanolic hydrochloric acid was added, and after addition of ether to the solution, a crystalline precipitate was obtained, which was recrystallized from ethanol giving 7-methoxy - 1 - methyl - 1,2,3,4 - tetrahydro-4-isoquinolinol hydrochloride, M.P. 174–175°.

Example 3

A mixture of 2 g. of 2-benzyl - 4 - hydroxy-7-methoxy-isoquinolinium chloride and 0.8 g. of 10% palladium-on-charcoal in 140 ml. of glacial acetic acid was hydrogenated at 70° under atmospheric pressure for 6 hours. After cooling to room temperature and removal of the catalyst by filtration, the filtrate was concentrated under reduced pressure giving a solid residue, which was recrystallized twice from methanol to give 4-hydroxy-7-methoxy-isoquinoline hydrochloride, M.P. 279–280°.

Example 4

A mixture of 4 g. of 2-benzyl - 6,7 - dimethoxy-4-hydroxyisoquinolinium chloride and 1.2 g. of 10% palladium-on-charcoal in 400 ml. of ethanol was hydrogenated at room temperature and under atmospheric pressure for 6 hours. After removal of the catalyst by filtration, the filtrate was concentrated to 150 ml. The crystalline precipitate which had formed was collected by filtration and recrystallized from methanol to give 6,7-dimethoxy-4-hydroxy-isoquinoline hydrochloride, M.P. 264–265°.

Example 5

A suspension of 9.9 g. of 2-benzyl - 3 - carbethoxy-1,2-dihydro - 6,7 - dimethoxy - 4(3H) - isoquinolone hydrochloride was treated with ammonium hydroxide solution and extracted several times with chloroform. The combined chloroform extracts were washed with water, dried, filtered and concentrated under reduced pressure. The free base of 2 - benzyl - 3 - carbethoxy - 1,2 - dihydro-6,7-dimethoxy - 4(3H) - isoquinolone hydrochloride thus obtained was dissolved in a mixture of 20 ml. of ethanol and 20 ml. of ethyl acetate. To the stirred solution was added with external cooling over a period of 4 hours, 1.4 g. of sodium borohydride at a rate to keep the temperature at 0°. After completion of this addition, the mixture was kept in the refrigerator (5° C.) for 15 hours. The solvent was removed under reduced pressure, the residue was treated with water and left standing at room temperature for 1 hour. After extraction with chloroform, the combined chloroform solution was dried, filtered and concentrated under vacuum. The residue was dissolved in ether and upon addition isopropanolic hydrogen chloride, a crystalline precipitate was obtained, which after recrystallization from methanol was found to be 2-benzyl - 3 - carbethoxy - 6,7 - dimethoxy - 4 - hydroxy - 1,2,3,4 - tetrahydroisoquinoline hydrochloride, M.P. 198°.

Example 6

The free base of 2-benzyl-3-carbethoxy-1,2-dihydro-6,7-dimethoxy-4(3H)-isoquinolone hydrochloride prepared from 4.5 g. of 2-benzyl-3-carbethoxy-1,2-dihydro-6,7-dimethoxy-4(3H)-isoquinolone hydrochloride as in Example 36 was dissolved in 200 ml. of a 1:1 mixture of ethanol and methanol. To the stirred solution, there was added 5 g. of sodium borohydride over a period of 30 min., during which time the temperature of the reaction mixture rose to 40–50°. The mixture was left standing at room temperature overnight. The solvent was removed under reduced pressure. The residue was treated with water and left standing for one hour at room temperature. After extraction several times, the combined chloroform extracts were dried, filtered and concentrated under vacuum. The residue was chromatographed on a silica gel column (Grace-Davison, Grade 923). Elution with 600 ml. of benzene-ethyl acetate (9:1), followed by 400 ml. of benzene-ethyl acetate (8:2) gave the free base of 2-benzyl-3-carbethoxy-6,7-dimethoxy-4-hydroxy-1,2,3,4 - tetrahydroisoquinoline hydrochloride. Elution with 600 ml. of benzene-methanol (1:1) gave an oil which was dissolved in ether and treated with an excess of isopropanolic hydrochloric acid to give crystalline 2-benzyl-6,7-dimethoxy-4-hydroxy-3-hydroxymethyl - 1,2,3,4-tetrahydroisoquinoline hydrochloride, M.P. 198–199°. Upon recrystallization of the last-mentioned product from ethanol-ether, it was found to have a melting point of 200–201°.

Example 7

A solution of 2 g. of the free base of 2-benzyl-3-carbethoxy-6,7-dimethoxy-4-hydroxy - 1,2,3,4-tetrahydroisoquinoline hydrochloride (prepared from the hydrochloride by means of sodium bicarbonate in 30 ml. of tetrahydrofuran) was added with stirring under nitrogen to an ice-cold slurry of 0.9 g. of lithium aluminum hydride in 30 ml. of tetrahydrofuran. After the addition was complete, the mixture was heated at reflux for 5 hours. The excess lithium aluminum hydride was destroyed by adding a saturated aqueous solution of sodium sulfate to the solution. Anhydrous sodium sulfate was added, the etheral solution was filtered, and the filtrate was concentrated under reduced pressure. The residue was dissolved in ether and treated with isopropanolic hydrochloric acid to give a crystalline precipitate. Recrystallization of the crystalline precipitate from ethanol-ether gave 2-benzyl-6,7-dimethoxy-4-hydroxy-3-hydroxymethyl-1,2,3-tetrahydroisoquinoline hydrochloride, M.P. 199–200°.

Example 8

To a suspension of 2.09 g. of 2-benzyl-3-carbethoxy-1,2-dihydro-7-methoxy-4(3H)-isoquinolone in 10 ml. of ethyl acetate and 10 ml. of ethanol was added in the cold, a slurry of 342 mg. of sodium borohydride in 5 ml. of ethanol. The temperature of the stirred mixture rose to 40–50° within one hour. After cooling, 1 g. of sodium borohydride was added and the mixture was stirred at room temperature overnight. The solvent was removed under reduced pressure, the residue was treated with water, left standing at room temperature for 30 min., and extracted with chloroform. The combined organic solution was washed with water, dried, filtered and concentrated under reduced pressure to give a solid residue. Recrystallization from benzene gave crystalline 2-benzyl-4-hydroxy-3-hydroxymethyl - 7 - methoxy-1,2,3,4-tetrahydroisoquinoline, M.P. 130–131°.

Example 9

To a solution of 3.6 g. of 7-methoxy-1,2,3,4-tetrahydro-4-isoquinolinol, propionate, hydrochloride in 100 ml. of glacial acetic acid was added 400 mg. of 10% palladium on charcoal. The mixture was hydrogenated at room temperature and atmospheric pressure until the hydrogen uptake was completed (4 hours). The catalyst was removed by filtration and the filtrate evaporated to dryness under reduced pressure. The crystalline residue was washed with ether and recrystallized from ethanol-methanol to give 7-methoxy-1,2,3,4-tetrahydro-4-isoquinolinol, propionate, hydrochloride M.P. 183–184°.

Example 10

To a suspension of 1.25 g. of lithium aluminum hydride in 35 ml. of anhydrous tetrahydrofuran was added slowly a solution of 3 g. of the free base of 2-benzyl-1,2-dihydro-7-hydroxy-4-(3H)-isoquinolone obtained from the hydrobromide by means of treatment of the latter with sodium bicarbonate in 60 ml. of anhydrous tetrahydrofuran. The mixture was refluxed for 4 hrs. under nitrogen. After cooling excess lithium aluminum hydride was destroyed by adding a saturated aqueous solution of sodium sulfate. The ethereal layer was decanted, dried and filtered. Addition of excess isopropanolic hydrogen chloride to the solution gave the crystalline hydrochloride which was twice recrystallized from methanol giving 2-benzyl-1,2,3,4-tetrahydro - 4,7-isoquinolinediol hydrochloride of M.P. 180–181°.

Example 11

To a solution of 1.2 g. of 1,2-dihydro-7-methoxy-2-methyl-4(3H)-isoquinolone, in 20 ml. of ethanol, there was added 0.6 g. sodiumborohydride. After stirring the mixture at room temperature for 6 hrs., the solvent was removed in vacuo and 30 ml. of water were added to the residue. The mixture was then extracted with ether, the organic layers were washed with water and dried over sodium sulfate.

After addition of isopropanolic hydrochloric acid to the ethereal solution, a crystalline precipitate was obtained which was recrystallized three times from ethanol giving 1,2,3,4-tetrahydro-7-methoxy-2-methyl-4-isoquinolinol hydrochloride, M.P. 173–174°.

Example 12

To a solution of 25 g. of 2-benzyl-1,2-dihydro-7-methoxy-4(3H)-isoquinolone in 400 ml. methanol, there was added 15 g. of sodium borohydride. The mixture was stirred overnight at room temperature and then evaporated to dryness in vacuo. To the residue was added 200 ml. of water and the mixture was extracted with ether. After drying over sodium sulfate, the combined organic layers were treated with isopropanolic hydrochloric acid to give 1,2,3,4-tetrahydro-2-benzyl-7-methoxy-4-isoquinolinol hydrochloride, M.P. 182–184°.

Example 13 thoxy-4(3H)-isoquinolone in 30 ml. of abs. tetrahydrofuran, there was added 850 mg. of lithium aluminum hydride. The mixture was refluxed for 12 hours. After decomposing the excess $L_1AlH_4$ with ethyl acetate and methanol, the mixture was diluted with water and extracted three times with methylene chloride. The combined organic layers were washed with water, dried over sodium sulfate and evaporated to dryness in vacuo. The oily residue was dissolved in an excess of 1 N methanolic hydrochloric acid. Addition of ether produced 1,2,3,4-tetrahydro-2-benzyl-7-methoxy - 4 - isoquinolinol hydrochloride, M.P. 181–183°.

Example 14

To a solution of 1 g. of 2-benzyl-1,2,-dihydro-7-me-
To a solution of 4.3 g. of 1,2-dihydro-7-methoxy-1,2-dimethyl-4(3H)-isoquinolone liberated from the hydrochloride thereof by means of 6 N sodium hydroxide in 60 ml. ethanol, there was added 2.5 g. of sodium borohydride. The resulting mixture was stirred overnight at room temperature. After evaporation to dryness in vacuo and addition of 100 ml. of water to the residue, the mixture was extracted with ether several times. Addition of isopropanolic hydrochloric acid to the combined dried ether extracts produced an oil, which could be crystallized with isopropanol giving 1,2,3,4-tetrahydro-7-methoxy-1,2-dimethyl-4-isoquinolinol hydrochloride, M.P. 159–161°. After recrystallization from isopropanol, the product melted at 159–161°.

Example 15

To a solution of 3 g. of 2-benzyl-1,2-dihydro-7-methoxy-1-methyl-4(3H)isoquinolone in 20 ml. of ethanol there was added 1.5 g. of sodium borohydride. After stirring at room temperature for 6 hrs. and standing overnight, the mixture was evaporated to dryness in vacuo, treated with 100 ml. of water and extracted with ether. To the combined and dried ethereal extracts, isopropanolic hydrochloric acid was added and the oily precipitate was crystallized from acetone. Recrystallization from acetone/ethanol gave 2-benzyl-1,2,3,4-tetrahydro-7-methoxy-1-methyl-4-isoquinolinol hydrochloride, M.P. 169–170°.

Example 16

To a solution of 1.4 g. of 1,2-dihydro-7-methoxy-2-methyl-1-phenyl-4(3H)-isoquinolone in 30 ml. ethanol, there was added 1 g. of sodium borohydride and the mixture was stirred at room temperature overnight. Removal of the solvent in vacuo and addition of water to the residue was followed by several extractions with ether. The combined ethereal layers were washed with water and dried over sodium sulfate. Addition of isopropanolic hydrochloric acid produced oily hydrochloride, namely, 1,2,3,4-tetrahydro-7-methoxy-2-methyl - 1 - phenyl-4-isoquinolinol hydrochloride, which was crystallized from isopropanol. Recrystallization from isopropanol afforded 1,2,3,4-tetrahydro - 7 - methoxy-2-methyl-1-phenyl-4-isoquinolinol hydrochloride, M.P. 173–174°.

Example 17

A mixture of 3 g. of 2-benzyl-1,2,3,4-tetrahydro-7-methoxy-1-methyl-4-isoquinolinol liberated from the hydrochloride thereof by means of sodium bicarbonate, 6 ml. of propionic acid anhydride and two drops of pyridine was heated at 100° with stirring for 3 hours. The cooled mixture was poured into water and an excess of 6 N sodium hydroxide was added. The aqueous solution was extracted three times with ether. The combined organic layers were washed with water and dried over sodium sulfate. Addition of excess isopropanolic hydrochloric acid to the ethereal solution produced the crystalline hydrochloride, which was recrystallized twice from ethanol giving 2-benzyl-1,2,3,4-tetrahydro-7-methoxy-1-methyl-4-isoquinolinol, propionate hydrochloride, M.P. 180–181°.

Example 18

A mixture of 10 g. of 1,2,3,4-tetrahydro-2-benzyl-7-methoxy-4-isoquinolinol liberated from the hydrochloride thereof by means of sodium bicarbonate, 25 ml. propionic acid anhydride and a few drops of pyridine was heated at 100° with stirring for 4 hours. The cooled mixture was poured into water and made basic with sodium bicarbonate. The aqueous solution was extracted with ether several times and the combined ether extracts were dried over sodium sulfate. Addition of excess isopropanolic hydrochloric acid to the ethereal solution produced the crystalline hydrochloride, which was recrystallized from ethanol, yielding 2-benzyl-1,2,3,4-tetrahydro-7-methoxy-4-isoquinolinol, propiontae hydrochloride, M.P. 174–175°. The product melted at 177–178° after recrystallization from ethanol.

Example 19

To a solution of 3.6 g. of 2-benzyl-1,2,3,4-tetrahydro-7-methoxy-4-isoquinolinol propionate hydrochloride in 100 ml. glacial acetic acid was added 400 mg. of 10% palladium on charcoal and the mixture was hydrogenated at room temperature and normal pressure for 4 hours. After this time the hydrogen uptake was completed. The catalyst was filtered and the filtrate evaporated to dryness in vacuo. The crystalline residue was washed with ether. Recrystallization from ethanol/methanol afforded 1,2,3,4-tetrahydro-7-methoxy-4-isoquinolinol, propionate, hydrochloride, M.P. 183–184°. The product melted at 184–185° after another recrystallization from ethanol.

Example 20

A solution of 4.07 g. of 2-benzyl-6,7-dimethoxy-4-hydroxy-1,2,3,4-tetrahydro-3-isoquinoline carboxylic acid ethyl ester hydrochloride in 40 ml. of 1 N methanolic sodium hydroxide was left standing overnight. After addition of 35 ml. of 1 N ethanolic hydrogen chloride to the solution, the solvents were removed under reduced pressure. The residue was suspended in dichloromethane and the clear solution after removal of the insoluble parts was evaporated to dryness. Addition of methanol to the residue gave crystalline material (M.P. 189–191°) which was suspended in methanol. Addition of excess isopropanolic hydrogen chloride to the suspension gave a clear solution. Upon addition of ether to this solution, crystalline 2-benzyl-6,7-dimethoxy-4-hydroxy-1,2,3,4-tetrahydro-3-isoquinoline carboxylic acid hydrochloride, M.P. 214–215° was obtained. Recrystallization from methanol/ether raised the M.P. to 215–216°.

We claim:
1. A compound of the formula

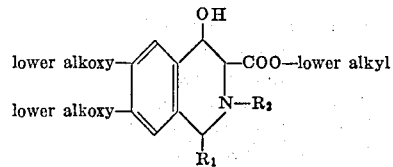

wherein $R_1$ signifies hydrogen, lower alkyl having from 1–4 carbon atoms, phenyl or halophenyl; $R_2$ signifies hydrogen, lower alkyl having from 1–4 carbon atoms, or benzyl, and the pharmaceutically acceptable acid addition salts thereof.

2. The compound of claim 1 of the formula 2-benzyl-3-carbethoxy-6,7-dimethoxy-4-hydroxy-1,2,3,4 - tetrahydroisoquinoline.

3. A compound of the formula

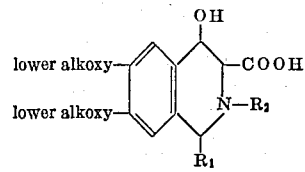

wherein $R_1$ signifies hydrogen, lower alkyl having from 1–4 carbon atoms, phenyl or halophenyl; $R_2$ signifies hydrogen, lower alkyl having from 1–4 carbon atoms, or benzyl, and the pharmaceutically acceptable salts thereof.

4. The compound of claim 3 of the formula 2-benzyl-6,7-dimethoxy-4-hydroxy - 1,2,3,4 - tetrahydro-3-isoquinoline carboxylic acid.

5. A compound of the formula

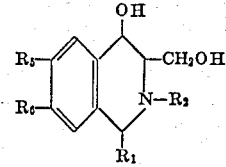

wherein $R_1$ signifies hydrogen, lower alkyl having from 1–4 carbon atoms, phenyl or halophenyl; $R_2$ signifies hydrogen, lower alkyl having from 1–4 carbon atoms, or benzyl; $R_5$ signifies hydrogen or lower alkoxy; $R_6$ signifies hydroxy or lower alkoxy and the pharmaceutically acceptable acid addition salts thereof.

6. The compound of claim 5 of the formula 2-benzyl-4-hydroxy-3-hydroxy - methyl-7-methoxy-1,2,3,4-tetrahydroisoquinoline.

References Cited

UNITED STATES PATENTS 3,457,266   7/1969   Gibas _____ 260—289 R

OTHER REFERENCES

Hinton et al., in Chem. Abstr., vol. 53, col. 15082–84 (1959).

Hodgkins et al., in Chem. Abstr., vol. 67, col. 43966x (1967).

Umezawa et al., in Chem. Abstr., vol. 68, col. 2757y (August 1968).

Hoshino et al., in Chem. Abstr., vol. 71, col. 3238k (July 1969).

DONALD G. DAUS, Primary Examiner

U.S. Cl. X.R.

260—289 R